US007263483B2

(12) United States Patent
Pearah et al.

(10) Patent No.: US 7,263,483 B2
(45) Date of Patent: Aug. 28, 2007

(54) USB DICTATION DEVICE

(75) Inventors: David E. Pearah, Winchester, MA (US); Francis Chen, Chelmsford, MA (US)

(73) Assignee: Dictaphone Corporation, Stratford, CT (US)

( * ) Notice: Subject to any disclaimer, the term of this patent is extended or adjusted under 35 U.S.C. 154(b) by 1 day.

(21) Appl. No.: 10/424,139

(22) Filed: Apr. 28, 2003

(65) Prior Publication Data

US 2004/0215452 A1    Oct. 28, 2004

(51) Int. Cl.
G10L 15/00 (2006.01)
G10L 15/26 (2006.01)
(52) U.S. Cl. .................. 704/235; 704/231; 704/270
(58) Field of Classification Search ............. 704/235, 704/251, 225, 275, 278, 231, 270; 381/359; 369/25.01
See application file for complete search history.

(56) References Cited

U.S. PATENT DOCUMENTS

| 4,523,055 | A |   | 6/1985  | Hohl               |
|-----------|---|---|---------|--------------------|
| 4,776,016 | A | * | 10/1988 | Hansen ....... 704/275 |
| 4,969,180 | A |   | 11/1990 | Watterson          |
| 5,197,052 | A |   | 3/1993  | Schroder           |
| 5,365,434 | A | * | 11/1994 | Figliuzzi ....... 704/1 |
| 5,402,518 | A |   | 3/1995  | Lowery             |
| 5,668,928 | A | * | 9/1997  | Groner ....... 704/251 |
| 5,721,827 | A |   | 2/1998  | Logan              |
| 5,724,106 | A | * | 3/1998  | Autry et al. ....... 348/734 |
| 5,732,216 | A |   | 3/1998  | Logan              |
| 5,754,430 | A | * | 5/1998  | Sawada ....... 704/275 |
| 5,781,643 | A | * | 7/1998  | Anderson ....... 381/355 |
| 5,812,977 | A |   | 9/1998  | Douglas            |
| 5,818,800 | A | * | 10/1998 | Barker ....... 369/29.02 |
| 5,838,313 | A |   | 11/1998 | Hou                |
| 5,857,099 | A |   | 1/1999  | Mitchell           |
| 5,875,448 | A | * | 2/1999  | Boys et al. ....... 704/260 |
| 6,001,015 | A | * | 12/1999 | Nishiumi et al. ....... 463/38 |
| 6,023,779 | A |   | 2/2000  | Fullam             |
| 6,049,796 | A |   | 4/2000  | Siitonen           |
| 6,108,415 | A | * | 8/2000  | Andrea ....... 379/433.03 |
| 6,138,036 | A |   | 10/2000 | O'Cinneide         |
| 6,169,911 | B1 |  | 1/2001  | Wagner             |
| 6,184,804 | B1 | * | 2/2001 | Harrison ....... 341/22 |
| 6,215,992 | B1 | * | 4/2001 | Howell et al. ....... 455/412.1 |
| 6,222,909 | B1 |  | 4/2001  | Qua                |
| 6,289,213 | B1 | * | 9/2001 | Flint et al. ....... 455/420 |
| 6,614,911 | B1 | * | 9/2003 | Watson et al. ....... 381/86 |

(Continued)

OTHER PUBLICATIONS

Handbook: "Learn Netscape", Netscape Communication Corp., 1996.

(Continued)

Primary Examiner—Patrick N. Edouard
Assistant Examiner—James S. Wozniak
(74) Attorney, Agent, or Firm—Kelley Drye & Warren LLP

(57) ABSTRACT

The invention includes a handheld device for receiving audio input in the form of speech. The handheld device is specifically optimized for digitally recording speech input for the purpose of speech recognition. The handheld device includes an ergonomically positioned pointing device to enable dictation and navigation through a document using only one hand. The handheld device may optionally include a memory device, a fingerprint security device, and a barcode scanner.

17 Claims, 6 Drawing Sheets

U.S. PATENT DOCUMENTS

| | | | |
|---|---|---|---|
| 6,697,841 B1 | 2/2004 | Sheffield | |
| 2002/0072820 A1* | 6/2002 | Thackston | 700/97 |
| 2002/0147390 A1* | 10/2002 | Markis et al. | 600/301 |
| 2003/0024975 A1* | 2/2003 | Rajasekharan | 235/375 |

OTHER PUBLICATIONS

Dictaphone USB PowerMic Microphone. First offered for sale in Jun. 2003. The USB PowerMic is shown in the Dictaphone quick reference guide entitled "PowerScribe® Workstation," Jun. 2003, p. 4 (copy included herewith).

Philips SpeechMike Pro 6274. Date of invention not presently known but prior to the date of the claimed invention. The SpeechMike Pro 6274 is shown in the Philips brochure entitled "A Revolution in the Palm of your Hand," 2004, pp. 1-2 (copy included herewith).

Philips SpeechMike Pro 6284. Date of invention not presently known but prior to the date of the claimed invention. The SpeechMike Pro 6284 is shown in the Philips brochure entitled "Ultimate Speed and Accuracy," 2004, pp. 1-2 (copy included herewith).

"Philips Develops USB Version of SpeechMike Pro," Oct. 26, 1999, pp. 1-5, available at http://www.findwealth.com/philips-develops-usb-version-of-87804pr.html.

\* cited by examiner

USB DICTATION DEVICE

BACKGROUND OF THE INVENTION

Dictation devices have been in common use in many fields in which it is inconvenient or undesirable to make handwritten or typewritten notes. One of the fields in which dictation devices have long been prevalent is the medical profession, and particularly so among radiologists, who often dictate their findings and diagnoses while referring to a photographic print of radiological data such as X-rays. It is common in these fields for a user of a dictation device to make voice recordings and provide these recordings to transcriptionists, who transcribe the recordings in order to generate written transcripts of the recording for the dictator's review or for record keeping purposes.

More recently, dictation technology has developed significantly and includes such tools as speech recognition software to eliminate some of the need for transcriptionists to transcribe recordings. However, a recognized and pervasive problem in the art is that speech recognition requires high quality audio input. Low quality audio input decreases the effectiveness of speech recognition algorithms, and frequently prevents them from functioning at all. It is therefore desirable to provide a microphone with superior audio quality for connecting to a computer for implementing speech recognition.

In some applications of dictation devices and speech recognition tools, a dictator uses a dictation device and speech recognition to complete blank text fields in a form. For example, many medical practices have specific forms wherein there is a printed query or prompt, followed by a blank text field into which a practitioner provides the requested text information regarding a particular patient. One way in which different fields are selected and activated to receive text from a voice recognition interface is by use of a pointing device, such as a mouse. However, this manner of selecting various fields for text input is unduly awkward as typically a user would prefer to use the same hand to manipulate the microphone as the mouse. Thus, it is desirable to provide an ergonomically convenient way to navigate through forms containing fields in which text is entered through a dictation device and a speech recognition interface.

Technological advances have led to newer and faster types of interfaces between peripheral devices and computers. Dictation microphones for connecting to computers running speech recognition software have been known in the art. However, these microphones connect to computers through one or more serial ports, and often require other connections as well, including speaker in, audio in, speaker out, audio out, power, RS232, and game port connections. These multiple connections make connecting the microphone to a computer a time consuming and complex process. Furthermore, many dictation microphones require connection to a sound card, which many laptop and some desktop computers lack. Therefore, a substantial number of computers are unable to connect to these sorts of dictation microphones. However, the development of the USB and USB2 standards ("Universal Serial Bus" and "USB2" are both hereafter simply referred to as "USB") have brought significant increases in speed and aided in uniform compatibility between peripheral devices and computers. It is desirable to provide a dictation microphone that can be connected simply and easily to a computer through a USB connection, through which two way communication between the microphone and the computer is established, and from which the microphone can draw substantially all of its power requirements.

In some applications a barcode identifier is used to identify the subject about which the user of a dictation device is dictating. For example, in the field of radiology, it is common for a radiologist to use a scanner to scan a barcode on a radiograph, such as an X-ray, which identifies the patient and/or the X-ray. The radiologist then records his findings and diagnoses into the dictation device with the assurance that this recording will be associated with the correct patient and/or X-ray. It is therefore desirable to provide a dictation device that may include a barcode or other such scanning ability.

A difficulty arises, however, because scanning devices generally, and in particular laser scanning devices, generate electromagnetic fields that can interfere with microphone circuitry and degrade audio signals, thus making speech recognition of those signals less accurate or impossible. Therefore, there is a need for circuitry that can overcome the effects of interference between the scanning and microphone elements in a dictation device having a scanner. It is desirable to have an integrated scanner/dictation device that can interface with a computer through a USB connection, and which can draw all of its power requirements from the USB port. However, the USB standard limits the amount of current that can be drawn to 500 mA, which may be insufficient to drive both the scanner and the dictation device.

OBJECTS OF THE INVENTION

In light of the above identified deficiencies of the prior art, an object of the present invention is to provide to provide a microphone with superior audio quality for connecting to a computer for implementing speech recognition.

It is another object of the present invention provide an ergonomically convenient way to navigate through forms containing fields in which text is entered through a dictation device and a speech recognition interface.

Yet another object of the present invention is to provide a dictation microphone that can be connected simply and easily to a computer through a USB connection, through which two way communication between the microphone and the computer is established, and from which the microphone can draw substantially all of its power requirements.

Still another object of the present invention is to provide to provide a dictation device that may include a barcode or other such scanning ability.

Another object of the present invention to provide an integrated scanner/dictation device that can interface with a computer through a USB connection which can draw all of its power requirements from the USB port.

SUMMARY OF THE INVENTION

The invention is a handheld device for receiving audio input in the form of speech, the audio input recorded in a recording medium and processed by a speech recognition engine, thereby generating text. The handheld device may comprise an omni-directional microphone element disposed at a distal end of the device for receiving the audio input in the form of speech and for generating an analog signal therefrom. The handheld device may further comprise a wind screen selected according to a predetermined wind noise sensitivity factor. The wind screen may be acoustically transparent and attenuate wind (air flow) noise for example with hard consonants, that create too great an analog signal and would otherwise disrupt the speech recognition. The handheld device may further comprise an electric circuit for receiving the audio input in the form of speech and for converting the analog signals to digital signals. The electric circuit may have a gain control for providing a signal level that is suitable for speech recognition.

The handheld device is preferably used in conjunction with a software program that utilizes a speech recognition engine to fill in blank portions of forms, thus allowing a user to input text in a blank portion of a form by simply speaking the words to be entered in that portion. The handheld device may include a set of input buttons ergonomically positioned on the top surface of the handheld device. The input buttons may include one or more buttons for selectively navigating through predetermined sections of a form, a button for selecting a predetermined section of a form, and a button for initiating recording.

The navigation buttons may include a button for advancing to the next predetermined section of a form and a button for going back to a previous predetermined section of a form. The buttons may further include a select button for selecting the active element in a form. The navigation buttons may be used to navigate through various elements in a form by sequentially activating those elements, then when a particular desired element is activated, the select button may be pressed to select the active element. Once an active element has been selected, text may be inserted into that element. The input buttons may include a button for initiating dictation. Preferably, text generated by the speech recognition engine is not immediately displayed as it is recognized because it has been found that for many users, this would be too distracting. Thus when dictation has been initiated by the user by pressing the dictation button, the text generated by the speech recognition engine is held in a buffer until the user presses an "insert text" button. When the user presses the "insert text" button, the contents of the buffer are displayed in the selected element of the form. In an alternative embodiment, the text generated by the speech recognition engine may be displayed immediately after the speech has been recognized and while the user is dictating.

Other functions of the buttons may include selecting a portion of text, playing a portion of an audio file, a stop button, a button for reviewing back through an audio file to a previously recorded portion of the file, a button for advancing through an audio file, and a button for playing a portion of an audio file through an integrated speaker on the handheld device. In one embodiment, the button for playing a portion of an audio file is also a stop button, such that if any function of the microphone is active, pressing the play/stop button will stop any active function. If no function of the microphone is active, pressing the play/stop button will play a portion of an audio file. The handheld device may also include a button for dictation which when pressed activates the microphone element to receive audio input in the form of speech. When this element is active, the audio input is digitized and transmitted to the speech recognition engine, which then translates the speech into text.

The handheld device may also include one or more buttons with programmable functions. These buttons may be assigned a function that may generally be quite complex by way of user recorded or prerecorded macros. In a preferred embodiment, the handheld device includes a "signature" button for electronically signing a form after it has been filled out. Actuation of this button designates the current document signed, the current document is saved and further editing is blocked. For example, if the handheld device is being used by a medical doctor, the doctor may complete a form and review it for accuracy, then press the "signature" button, which adds a marker to the document indicating that it has been completed and reviewed, and that the doctor acknowledges that the information contained in the document is true and complete. After the "signature" button is pressed, the document may be saved and marked as read-only to prevent further editing of the document.

Another button that would be particularly useful for medical professionals is a "coding" button. When the "coding" button is pressed, a dialog box may appear containing diagnosis numbers. Particular maladies are typically assigned unique codes. A doctor can press the "coding" button and view a menu or other dialog box and select a numerical code corresponding to the diagnosis. This code may then be appended to the document. The numerical codes simplify billing procedures because most insurance carriers rely on these codes rather than a textual description of the maladies treated in order to determine how much to pay for particular procedures. The codes may also provide a database to ease the process of searching, for example, for patients with particular maladies. Further details on coding operations can be found in co-pending U.S. Provisional Patent Application Ser. No. 60/436,456, filed Dec. 27, 2002, incorporated herein by reference in its entirety.

Preferably, the buttons are ergonomically positioned to allow one-handed navigation through the predetermined sections of a form, selection of a predetermined section of a form, initiation of recording, and insertion of text. The ergonomic positioning of the buttons preferably allows one-handed operation of every function available on the microphone.

The handheld device may include a pointing device on its top surface that may be actuated by the user's thumb. Preferably, the pointing device is a microjoystick or thumbstick, although it may also be a trackball or touchpad, or any other suitable pointing device. The pointing device has associated with it at least one button. Preferably, there is a button on the top of the handheld device, just below the pointing device. Most preferably, there is a button on the bottom of the handheld device, beneath where a user's index finger would naturally rest, such that advanced mouse maneuvers such as drag-and-drop may be performed by holding down the button with the index finger while moving the pointing device with the thumb.

In one aspect, the invention is a handheld USB device for receiving audio input in the form of speech. The audio input may be recorded in a recording medium and processed by a speech recognition engine, thereby generating text. The handheld device may include a USB hub for receiving and transmitting signals through a USB interface to a USB root hub in a computer. It may further include a power switch for switching power drawn from the USB interface between a first USB port on the USB hub and a second USB port on the USB hub. It may further include a pointing device connected to the second USB port on the USB hub. It may further include a USB streaming controller connected to the first USB port on the USB hub. The USB streaming controller may receive digital audio signals from an audio codec, which converts analog audio signals from a microphone element on the handheld device into the digital audio signals.

Preferably, the handheld USB device includes a preamplifier between the audio codec and the microphone element for amplifying the analog audio signals from the microphone element before they are digitized by the audio codec into digital audio signals. The handheld USB device also preferably includes a speaker. Digital audio signals from the USB streaming controller may be converted into analog signals by the audio codec. These analog signals may then be amplified by an amplifier, and the amplified analog audio signals then used to drive the speaker.

The handheld USB device may include buttons connected to switches, such as USB human interface devices. The buttons and switches may be arranged such that when a button is pressed, its corresponding switch is closed. Alternatively, when a button is pressed, its corresponding switch may be opened, if the default position of the switch is closed. The USB streaming controller may be used to detect whether a switch is opened or closed, and thereby may send a signal through a USB port on the USB hub, which then transmits the signal through a USB interface to a USB root hub on a host computer. The USB streaming controller may also be connected to one or more LEDs, which the USB streaming controller may light in response to a signal indicating that a button has been pressed. Preferably, the USB streaming controller lights an LED when the button corresponding to the "record" function of the handheld USB device is pressed.

In one embodiment, the handheld USB device may include a data storage device. Preferably, the data storage device is a memory stick or a SmartMedia™ card. In other embodiments, the data storage device may be any data storage means known to those in the art. In another embodiment, the handheld USB device may include a fingerprint security device. Preferably, the fingerprint security device will lock out any unauthorized user, thus preventing unauthorized users to use the handheld USB device to create or alter medical records. The handheld USB device may further include a barcode scanner for scanning barcodes, for example, on medical records to identify the patient, or on pharmaceutical packaging to ensure patients receive the correct medicines.

The above advantages and features are of representative embodiments only, and are presented only to assist in understanding the invention. It should be understood that they are not to be considered limitations on the invention as defined by the claims, or limitations on equivalents to the claims. Additional features and advantages of the invention will become apparent from the drawings, the following description, and the claims.

BRIEF DESCRIPTION OF THE DRAWINGS

While the specification concludes with claims particularly pointing out and distinctly claiming the present invention, it is believed the same will be better understood from the following description taken in conjunction with the accompanying drawings, which illustrate, in a non-limiting fashion, the best mode presently contemplated for carrying out the present invention, and in which like reference numerals designate like parts throughout the figures, wherein:

DETAILED DESCRIPTION OF THE PREFERRED EMBODIMENTS

The present invention encompasses dictation microphones and dictation microphones with integrated scanning units. The invention includes a novel ergonomic layout for facilitating use of the dictation microphones with application software implementing voice recognition algorithms to reduce voice data to text and to place the text in appropriate blank fields in a form. The novel ergonomic layout further includes a pointing device with buttons positioned to facilitate pointing device functionality, such as drag-and-drop. The invention solves a number of problems associated with prior art methods of interfacing dictation devices with computers and provides a convenient USB interface. The invention further solves power limitation problems associated with the integration of dictation devices with scanning devices using a USB interface.

It is known in the art that hard consonant sounds, like -d, -t, -p, -b, -x, and -z have higher instantaneous energies, that is they create higher wind speed than other sounds, and can reduce a microphone's fidelity, and thus cause speech recognition rates to drop. This effect is deemed "Wind Noise Sensitivity" (WNS). The inventors have developed a test for determining whether a microphone and windscreen combination is adequately resistant to these wind noises. For an electret microphone with an output sensitivity of −44 dB (1 KHz, 0 dB=1 V/pA), the WNS should be less than −60 dB at a wind speed of 1 meter/sec in order to provide an audio fidelity adequate for voice recognition. It is anticipated, however, that increasingly sophisticated voice recognition algorithms may overcome the limitations of noise introduced by hard consonant sounds, and that a greater WNS would be adequate. One aspect of this invention is a method for determining whether a particular microphone and windscreen combination is adequate for use with a voice recognition algorithm.

Figure 1:
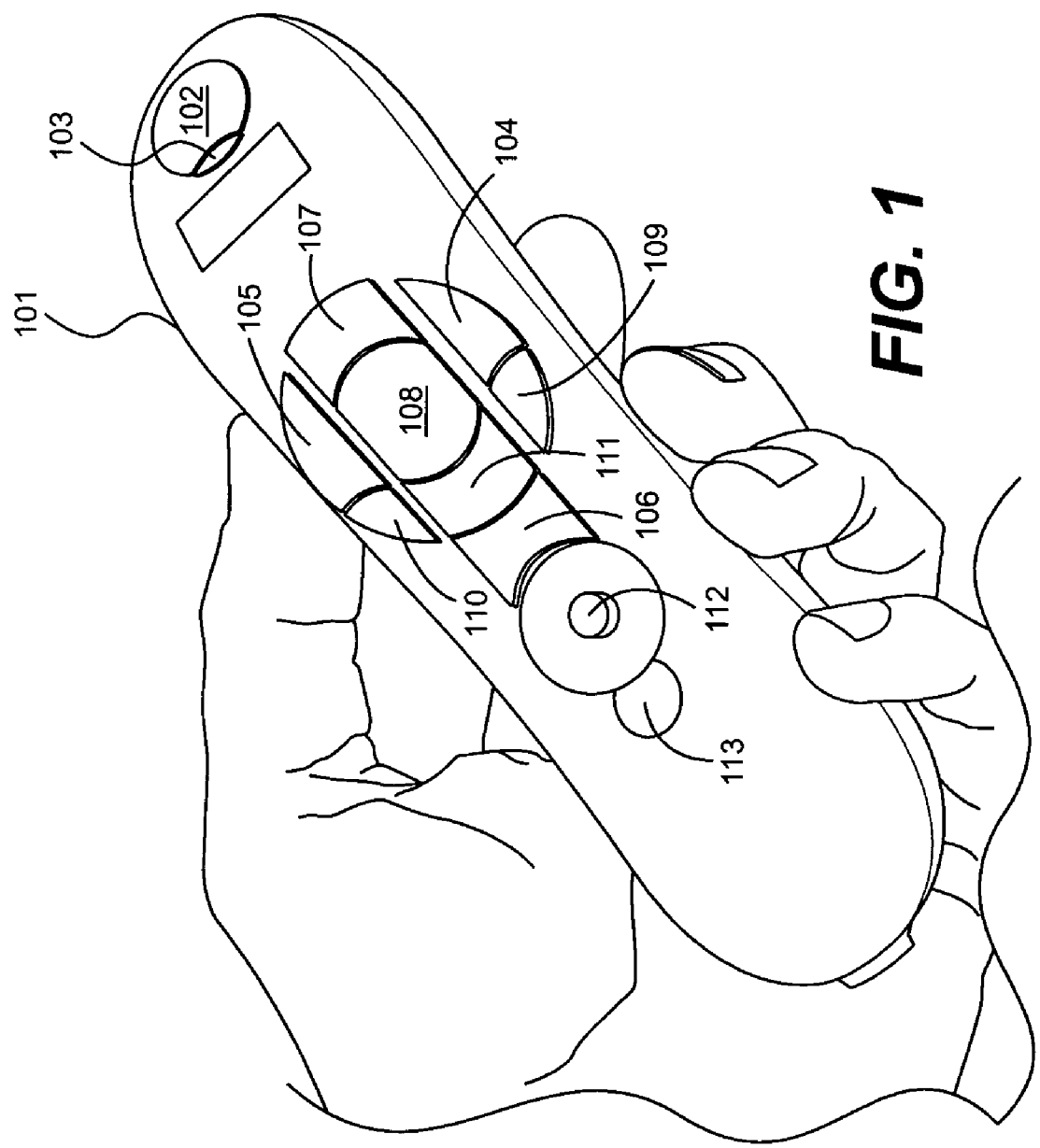
FIG. 1 is a top view of one embodiment of the dictation device of the invention.

FIG. 1 shows a top view of an embodiment of the microphone of the invention 101. The microphone element 102 may be protected by a windscreen consisting of a layer of foam padding material, preferably polyurethane foam, with a thickness of 0.5 to 1.6 cm and a porosity of between 60 and 90 ppi (pores per inch). Preferably, the windscreen is a polyurethane foam with a porosity between about 100 and 130 ppi and a thickness of between 0.6 cm and 1 cm, most preferably 0.9 cm. Most preferably, the windscreen minimizes the wind noise sensitivity of the microphone yet has a flat and high transmission profile across the audible frequency range (approximately 20 Hz to 20 kHz). Preferably, the windscreen is affixed to the microphone by being placed such that its sides are pinched between the microphone casing and the microphone element itself in such a manner as to make it flush with the surface of the microphone. This design prevents shear forces from detaching the windscreen. Preferably, glue is not used to affix the windscreen to the microphone because the glue could dislodge and get into the microphone element, thus degrading the analog signal from the microphone and making speech recognition difficult or impossible.

The microphone 102 is preferably a close-talking microphone. Preferably, the microphone element is adapted to receive audio input from a speaker whose mouth is between 0.5 and several inches from the microphone element. Preferably, the microphone element can be as much as 45 degrees of mouth axis. The large variation in frequency response of unidirectional and noise-canceling microphones under those conditions make these microphones ill-suited for this application because of the resulting decrease in the accuracy of speech recognition. However, these microphones may be used in this application if users are cautious about how they hold the microphone, or if the microphone is mounted in a fixed relation to the user's mouth. The microphone element is preferably an omni-directional microphone with a frequency response that is substantially flat over a range of angles and distances.

A plurality of buttons 104-111 allow the user to control the dictation functions. A "next" button 104 allows the user to advance to the next field in a form. A "previous" button 105 allows the user to go back to the previous field in a form. A "select" button 106 allows the user to select the current field in a form. An "insert text" button 107 allows the user to insert text at the current position of the cursor that has been stored in a buffer during dictation. A "dictate" button 108 begins the recording process, allowing the user's speech to be recorded. An LED indicator 103 is lit when the microphone is recording. A "fast forward" button 109 allows the user to skip through previously recorded speech to search for a particular portion. A "review" button 110 allows the user to skip backward through previously recorded speech to search for a particular portion. A combination "stop/play" toggle button either allows the user to play previously recorded speech, or to stop playback of previously recorded speech or any other active function of the microphone.

A thumbstick pointing device 112 is included to allow the user to navigate through a form document or for any other reason that a mouse pointing device is normally user for. The thumbstick pointing device also includes a mouse button 113. In a preferred embodiment, the pointing device is a force sensing resistor micro joystick pointing device. In alternative embodiments, the thumbstick pointing device can be any other suitable pointing device, such as a trackball.

Two additional buttons (not shown) are optionally present. Generally, these two buttons can be programmable to meet individual users' needs. In a preferred embodiment, actuation of one of the additional buttons executes a software routine to provide an electronic signature for signing forms after they have been filled out using the microphone and voice recognition technology. In this embodiment, actuation of the signature button adds a "signed" notation to the form after it has been filled out, saves the completed form, and marks it read-only. In this embodiment, actuation of the other additional button executes a software routine to provide a menu of codes corresponding to a malady which a doctor has diagnosed in a patient. The doctor selects the code corresponding to her diagnosis, and the code may be associated with the form or forwarded to the patient's insurer for billing purposes. Either of these two additional buttons may be programmed to have an arbitrary function. For example, one of the buttons may be programmed to automatically generate and send an email message containing a recently recorded digital audio file recently recorded on the handheld dictation device to a predetermined recipient, as disclosed in co-pending U.S. patent application Ser. No. 09/099,501, entitled "Dictation System Employing Computer-to-Computer Transmission of Voice Files Controlled by Hand Microphone," filed Jun. 8, 1998, and incorporated herein by reference.

Figure 2:
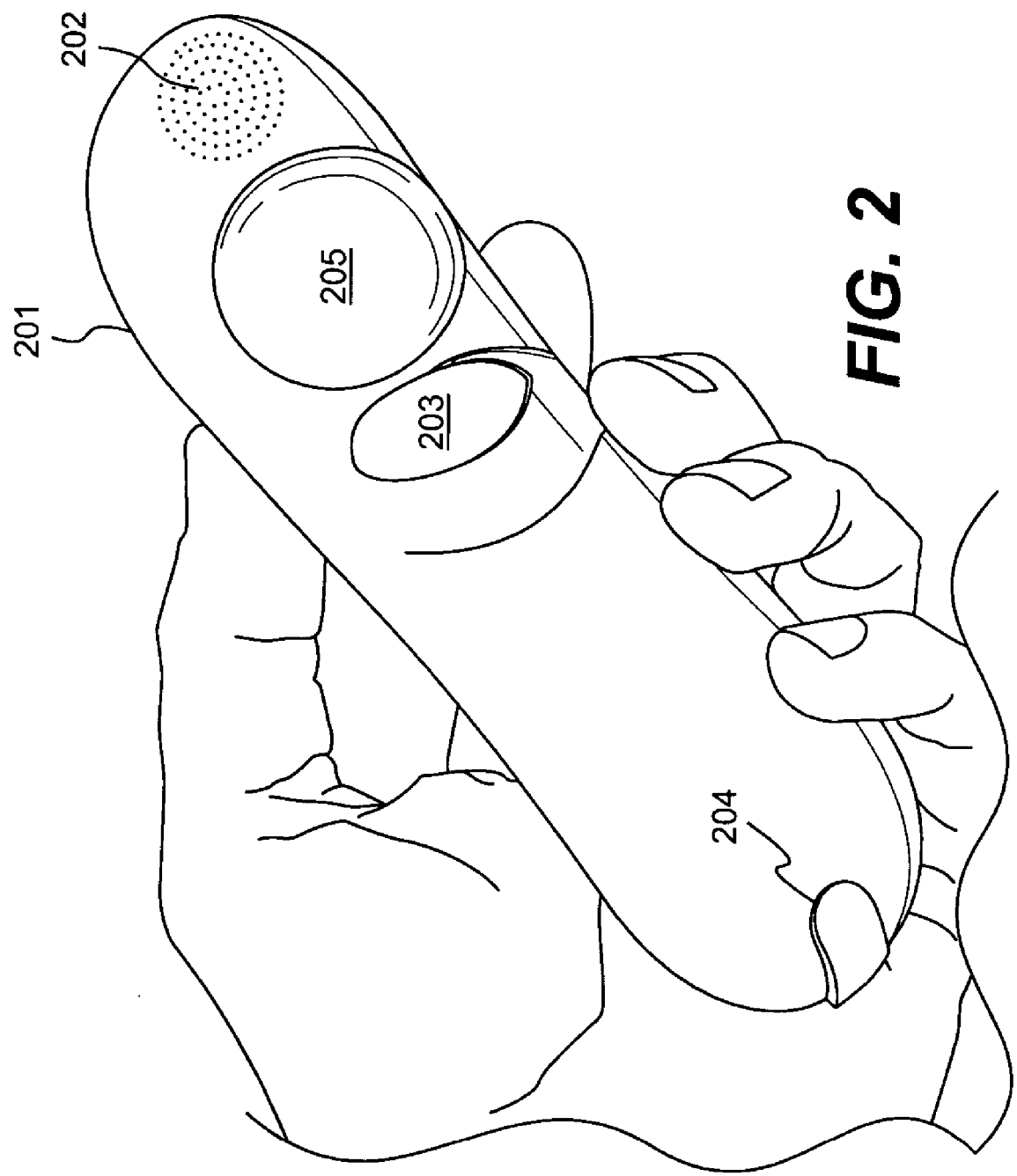
FIG. 2 is a bottom view of one embodiment of the dictation device of the invention.

FIG. 2 shows a bottom view of an embodiment of the microphone of the invention 201. A speaker 202 may be included for playing back previously recorded speech or other wav files. A button 203 may be used in conjunction with the thumbstick pointing device 112 and is preferably corresponds to a left mouse button. This allows the user to manipulate the thumbstick pointing device 112 while simultaneously holding down the button 203, thus allowing for mouse operations such as drag-and-drop. At the base of the microphone 204 may be a slot for removable memory. Also included may be a space 205 for an integrated barcode scanner.

Figure 3:
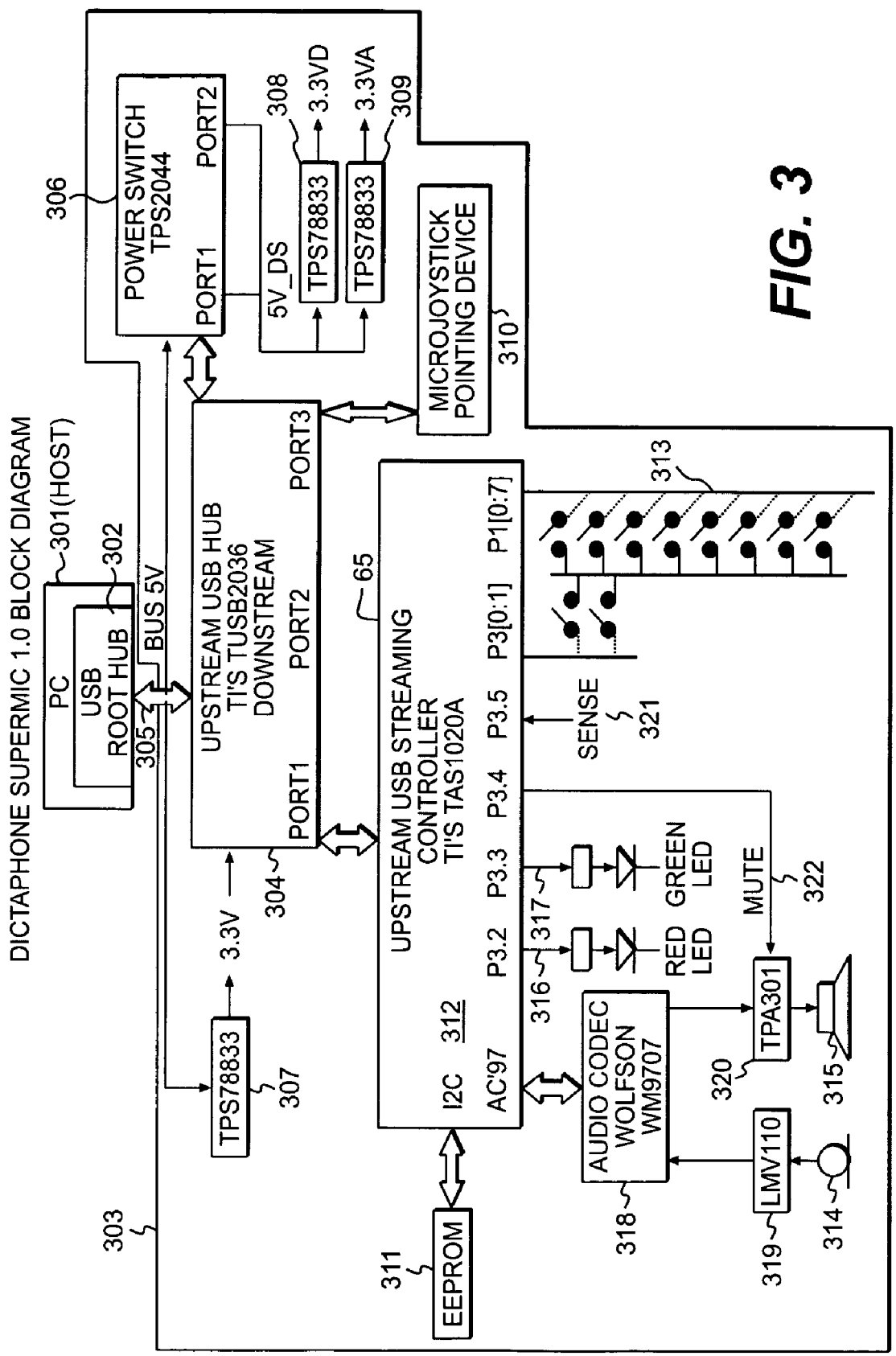
FIG. 3 is a block diagram of one embodiment of the dictation device of the invention without an integrated scanner.

FIG. 3 shows a block diagram of an embodiment of the microphone of the invention. In this embodiment, a host PC 301 having a USB root hub 302 may be connected to the microphone 303 through a USB connector 305. The USB connector connects to a USB hub controller 304 in the microphone 303. The USB hub controller 304 in the microphone 303 can interpret the various signals coming from the elements on board the microphone 303 in order to send those signals in a meaningful way to the host PC 301. The USB hub controller 304 thus allows multiple elements in the microphone 303 to send signals to the host PC without the signals becoming intractably entangled. In a preferred embodiment, the USB hub controller 304 is comprised of a Texas Instruments™ TUSB2036 2- or 3-port USB hub chip. A power supply voltage regulator 307 may convert +5V routed from the USB connection to the +3.3V needed to power the USB hub controller chip 304. In a preferred embodiment, the USB hub controller 304 is powered by a Texas Instruments™ TPS78833 power supply voltage regulator 307.

A power switch 306 may provide power management for the downstream devices in order to comply with USB power management requirements. Preferably, the power switch 306 is a Texas Instruments™ TPS2044 chip. Both output ports of power switch 306 are tied together, and the +5V output is directed to two power supply voltage regulators 308 and 309. In the event of an overcurrent, the power switch 306 can switch off the power to the power supply voltage regulators 308 and 309. When the power switch 306 is active, thus sending +5V to the power supply voltage regulators 308 and 309, the power supply voltage regulators may convert +5V from the USB connection to the +3.3V needed to power the downstream elements. Regulators 308 and 309 may independently provide +3.3V to the digital components of the handheld device (regulator 308) and the analog components of the handheld device (regulator 309). The independence of the two regulators allows a highly uniform voltage source to be provided to the analog elements (the microphone 314, speaker 315, and amplifiers 319 and 320), regardless of the power requirements of the digital components (the EEPROM 311, the audio CODEC 318, and the streaming controller 312).

Under the USB standard, only 500 mA of current can be drawn from the USB connection. Preferably, high-power functions will draw less than 100 mA at power up. Thus, the power switch 306 serves the additional function of shutting down the downstream devices if they attempt to draw more than this maximum amount of current. Note that the power to the USB hub controller chip is preferably powered by an independent power supply voltage regulator 307 that is not switched by the power switch 306. In a preferred embodiment, the USB streaming controller 312 is attached to a current sensing device or other sensor 321. When the sensor 321 senses an overcurrent or the activation of an element with excessive current requirements, the USB streaming controller 312 can send a signal 322 to the speaker amplifier 320 that mutes the speaker 315, thus reducing the current requirements of the handheld device. In the embodiment of the invention shown in FIG. 3, there is no barcode scanner, and thus it is not expected that a current in excess of 500 mA would ever be required. Thus the sensor element 321 is not strictly necessary in this embodiment. However, the mute signal 322 may still be sent by the host computer 301 when the recording mode is activated in order to prevent sounds from the speaker 315 to be picked up by the microphone 314 during dictation.

In a preferred embodiment, the dictation microphone 303 has an on-board pointing device, preferably a microjoystick pointing device 310. The pointing device 310 is connected to one of the ports of the USB hub controller 304. Microjoysticks that may be used with the present invention can be obtained from Interlink Electronics™.

The microphone 303 further includes an electrically erasable programmable read only memory (EEPROM) 311 for storing instructions including CODECs and input and output data bit rates for the USB streaming controller 312. The EEPROM 311 is connected to the 12C port of the USB streaming controller 312. The EEPROM can be programmed or reprogrammed by way of signals from the USB root hub 302 through the USB connection 305 to the USB hub 304 and the USB streaming controller 312 using for example, a device firmware upgrade utility which is compliant with USB Device Class Specification for DFU 1.0. Preferably, the EEPROM is a Microchip Technology Inc.™ 24LC64 chip.

A USB streaming controller 312 receives the input from several switches 313 and the microphone element 314, and provides the output to the on-board speaker 315 and two light-emitting diodes (LEDs) 316 and 317. Each of the LEDs may be lit under certain specific circumstances, for example, when the handheld device is plugged in one LED may be lit to indicate the device is ready to be used, and the other LET may be lit during the recording or dictating process. The switches 313 correspond to the buttons 104-111 described with reference to FIG. 1, as well as the two programmable buttons, such that actuation of any of those buttons results in the closure of the corresponding switch. In a preferred embodiment, the USB streaming controller is a Texas Instruments™ TAS 1020A chip.

Also connected to the USB streaming controller 312 is an audio coder/decoder (CODEC) for converting analog signals from the microphone 314 into digital signals that can be transmitted to the PC host 301 or stored in an optional on-board memory (not shown). Between the microphone 314 and the audio CODEC 318 is a fixed gain front end amplifier 319 for amplifying the analog signal from the microphone to take advantage of a greater dynamic range before the signal is digitized. The audio CODEC 318 also serves the function of converting digital signals from the PC host 301 or stored in an optional on-board memory (not shown) into analog signals, which can be played on the on-board speaker 315. Between the audio CODEC 318 and the speaker 315 is an amplifier 320 for amplifying the analog signal to produce an adequate volume at the speaker 315. In a preferred embodiment, the audio CODEC 318 is a Wolfson™ WM9707 chip, the fixed gain front end amplifier 319 is a National Semiconductor™ LMV 110 chip, and the speaker amplifier is a 0.35 W mono audio power amplifier comprising a Texas Instruments™ TPA301 chip. Also in this preferred embodiment, the microphone 314 is an electric condenser microphone such as Panasonic's™ WM-52M and the speaker 315 is a Panasonic™ EAS2P104H micro speaker.

Figure 4:
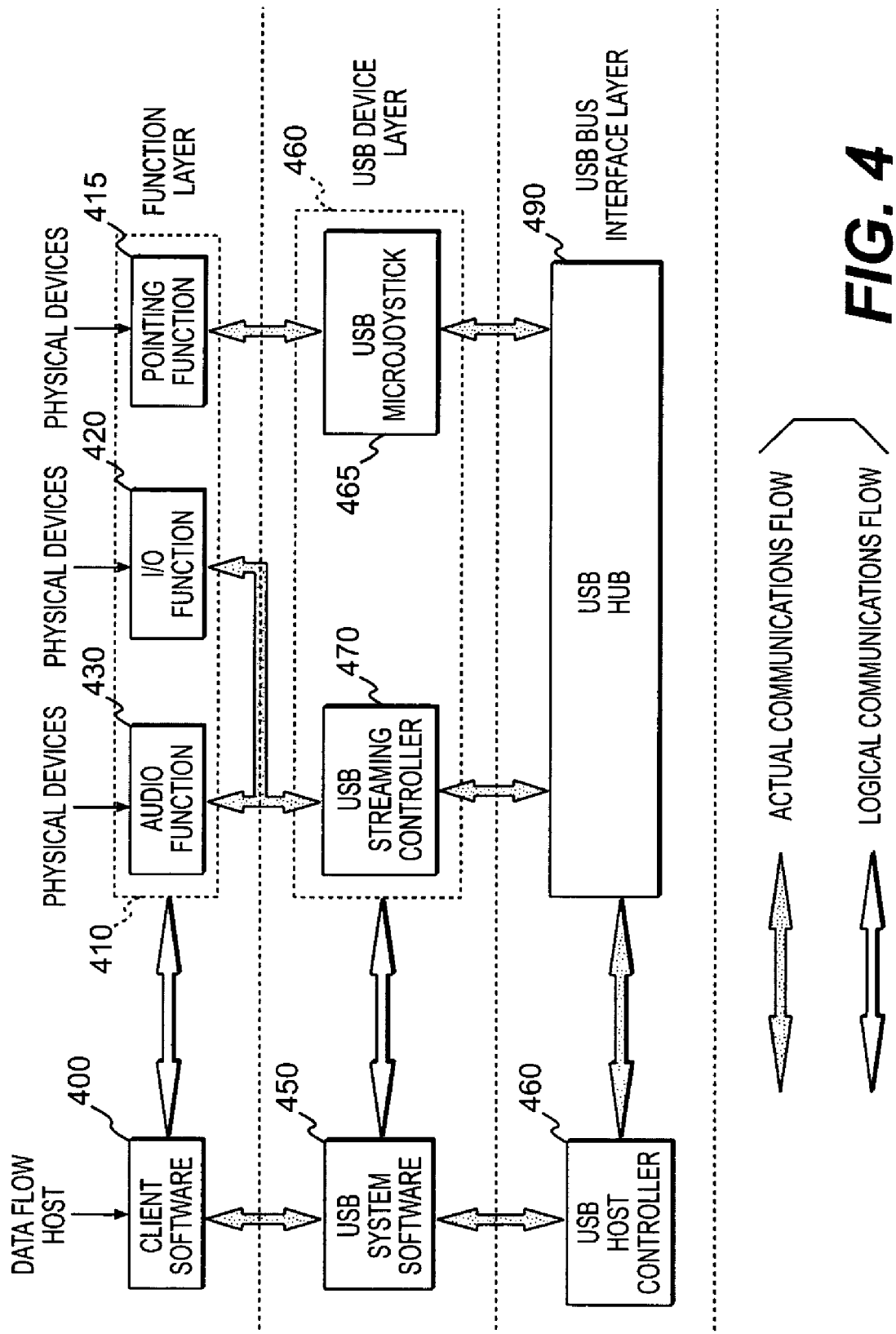
FIG. 4 is a block diagram showing the data flow among the various components of one embodiment of the dictation device of the invention.

FIG. 4 is a block diagram showing the data flow through three conceptual "layers"—a function layer 410, a USB device layer 460, and a USB bus interface layer 490. Solid arrows represent data flow and hollow arrows represent logical communications flow, or instructions provided from one component to another. The client software 400 can be any voice recognition software, especially voice recognition software as part of a larger application that allows forms with blank fields to be retrieved and where the blank fields can be filled in using voice recognition. The USB system software 450 and USB host controller 480 can be any suitable USB system and host controller software, for example those provided with typical operating systems having USB capability, such as Windows™ or Linux. The USB hub 490 is internal to the dictation device, and corresponds to element 304 in FIG. 3 for separate control of a USB Streaming Controller and a pointing device controller. The USB device layer includes a USB streaming controller 470 and the USB pointing device controller 465, each with a data connection to the USB hub 490.

The function layer includes an audio function 430, for receiving analog audio data from the microphone physical device and converting the analog data to digital for transmission through the USB streaming controller 470 to the USB hub 490, through the USB host controller 480, through the USB system software 450, to the client software 400, where voice recognition algorithms converts the audio data to text, and places that text in the appropriate place, for example in a form document. Within the audio function 430 is the capability to output to the speaker physical device. The client software sends digitally encoded audio data through the USB system software 450, the USB host controller 480, the USB hub 490, the USB streaming controller 470, to the audio function, which converts the digital data to analog, which is then amplified, and the amplified signal drives the speaker physical device.

The function layer also includes several input/output (I/O) functions 420, for receiving input in the form of an identity of an actuated button. This data is likewise transmitted through the USB streaming controller 470, the USB hub 490, the USB host controller 480, the USB system software 450, to the client software 400, which recognizes the actuated button as corresponding to a command to be performed in the client software application.

The function layer also includes a pointing function 415, which receives data from the pointing physical device and buttons. The pointing data is routed through the USB micro joystick controller 465, through the USB hub 490, through the USB host controller 480, through the USB system software 450, to the client software 400, where the pointing data is used, for example, to navigate through a form having blank fields to be filled in by a user.

Figure 5:
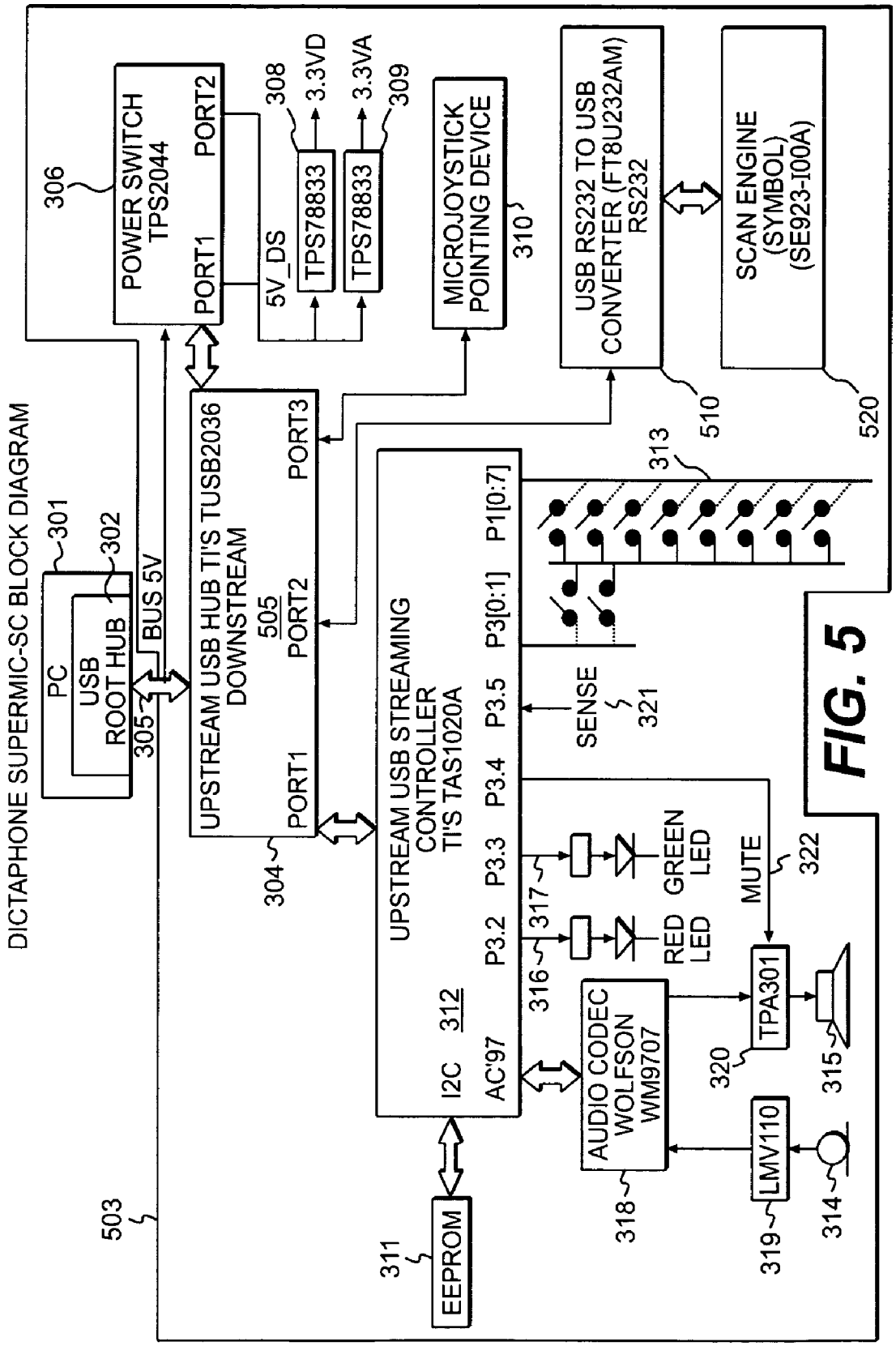
FIG. 5 is a block diagram of one embodiment of the dictation device of the invention with an integrated scanner.

FIG. 5 is a block diagram of an embodiment of the microphone of the invention having an integrated scanner. The basic design is similar to that shown in FIG. 3, except that there is additionally a scanning device attached to one of the ports 505 of the USB hub. A host PC 301 having a USB root hub 302 may be connected to the microphone 303 through a USB connector 305. The USB connector connects to a USB hub controller 304 in the microphone 503. The USB hub controller 304 in the microphone 503 can interpret the various signals coming from the elements on board the microphone 303 in order to send those signals in a meaningful way to the host PC 301. The USB hub controller 304 thus allows multiple elements in the microphone 303 to send signals to the host PC without the signals becoming intractably entangled. In a preferred embodiment, the USB hub controller 304 is comprised of a Texas Instruments™ TUSB2036 2- or 3-port USB hub chip.

The scan engine 520 may be an integrated device such as the SE923-I00A, which has an RS232 output. The output from the scan engine should be converted from the RS232 standard to the USB standard, for example, by use of an RS232 to USB converter 510 such as an FT8U232AM chip. In a preferred embodiment, the USB streaming controller 312 is attached to a current sensing device or other sensor 321. When the sensor 321 senses an overcurrent or the activation of an element with excessive current requirements, for example, when the scanning element 520 is activated, the USB streaming controller 312 can send a signal 322 to the speaker amplifier 320 that mutes the speaker 315, thus reducing the current requirements of the handheld device.

Figure 6:
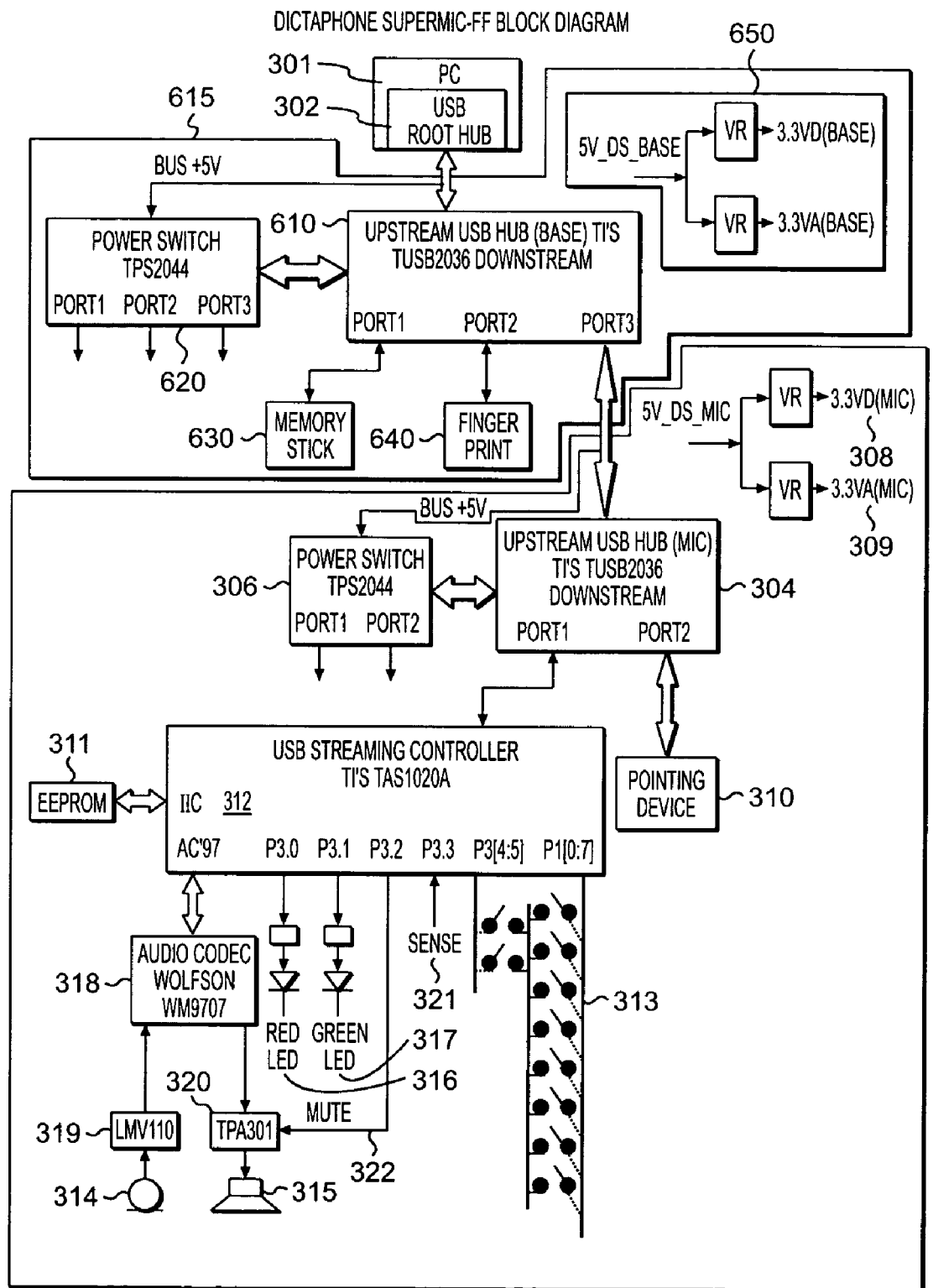
FIG. 6 is a block diagram of one embodiment of the dictation device of the invention with fingerprint security and memory stick features.

FIG. 6 is a block diagram of one embodiment of the dictation device of the invention with fingerprint security and memory stick features. The basic design of the microphone unit 603 is similar to that shown in FIG. 3, except that there is an additional USB hub controller 610. The additional USB hub controller may be part of the microphone unit itself, or it may be part of a separate base unit 615 that is attached to the computer 301. The remainder of the description of this embodiment presumes that there is a separate base unit 615 attached to the computer through the USB root hub 302. In this embodiment, additional supply voltage regulators 650 and an additional power switch 620 provides power to the base unit 615.

The base unit may further have an additional USB hub controller 610. One part of the additional USB hub controller 610 may be connected to the USB hub controller for the microphone and pointing device 304, as described above in the text accompanying FIG. 3. The other two ports of the additional USB hub controller 610 may be used for other features. In this embodiment, one of the other two ports of the additional USB hub controller 610 may accommodate additional memory, for example, through a memory stick such as SmartMedia™ or any other memory device, so that dictation may be digitally stored within the microphone 603, base unit 615, or both. The remaining port of the additional USB hub controller 610 may accommodate a fingerprint identification device 640. A fingerprint identification device 640 would only allow authorized users to use a microphone of the invention to dictate and sign medical reports.

What is claimed is:

1. A handheld device for receiving speech as audio input, converting speech to text and for entering the text into a computer operatively connected to a database for storing at least one electronic form having a plurality of sections, the handheld device comprising:
    a microphone operatively connected to the handheld device,
    a wind screen affixed to the microphone, the wind screen selected according to a predetermined wind noise sensitivity,
    an analog-to-digital converter, said analog-to-digital converter transforming analog signals from the microphone into digital signals received by the computer and recognized as text,
    a gain control element electrically connected between the microphone and the analog-to-digital converter, the gain control element operatively maintaining the analog signals at a level suitable for speech recognition, and
    a plurality of input buttons on the handheld device, where at least one of the plurality of input buttons is programmed to direct text insertion to a section of the form preassigned to said at least one input button when said at least one input button is activated,
    an activator button for initiating receiving of the audio input text into the section of the form selected by the user by activating said at least one programmable button,
    a bar code scanner, and
    a controller, said controller sending a signal to mute a speaker upon the activation of an element with excessive current requirements.

2. The handheld device of claim 1, wherein the plurality of input buttons includes a button for advancing to a next predetermined section of the form and a button for going back to the previous predetermined section of the form.

3. The handheld device of claim 1, wherein the plurality of input buttons includes a button for selecting a portion of text.

4. The handheld device of claim 1, wherein the plurality of input buttons includes a button for reviewing back through an audio file to a previously recorded portion of the file, a button for advancing through an audio file to a previously recorded portion of the file, and a button for playing a portion of an audio file through an integrated speaker on the handheld device.

5. The handheld device of claim 4, wherein the button for playing a portion of an audio file is also a stop button, wherein when any function of the handheld device is active, pressing the stop button deactivates the handheld device.

6. The handheld device of claim 1, wherein the plurality of input buttons includes a button for dictation, wherein when the button for dictation is pressed, the microphone is activated to receive speech as audio input, the audio input is digitized and transmitted to a speech recognition engine, and the speech recognition engine translates the speech into text.

7. The handheld device of claim 1, further comprising a pointing device on the top surface of the handheld device and at least one button associated with the pointing device.

8. The handheld device of claim 7, wherein the pointing device is a microjoystick.

9. The handheld device of claim 7, wherein the at least one button associated with the pointing device is on the bottom surface of the handheld device.

10. The handheld device of claim 1, wherein the plurality of input buttons includes a button for signing a form, wherein when the button for signing a form is pressed, the form is modified to include an indicator that the form has been signed.

11. The handheld device of claim 1, wherein the plurality of input buttons includes a button for coding.

12. The handheld device of claim 1, wherein the input buttons are programmed by the user.

13. The handheld device of claim 1, wherein the electronic form is displayed on a computer monitor operatively connected to the computer.

14. The handheld device of claim 1, wherein the plurality of input buttons are ergonomically positioned.

15. The handheld device of claim 1, wherein the plurality of buttons is positioned on the handheld device to allow one-handed navigation through the form.

16. The handheld device of claim 1, wherein the handheld device is operatively connected to the computer by a universal serial bus (USB) connection.

17. The handheld device of claim 1, wherein the bar code scanner recognizes said at least one electronic form and the plurality of sections corresponding to said at least one form.

* * * * *